United States Patent [19]
Katakura

[11] Patent Number: 5,475,274
[45] Date of Patent: Dec. 12, 1995

[54] DRIVING MOTOR

[75] Inventor: Koichi Katakura, Komagane, Japan

[73] Assignee: Sankyo Seiki Mfg. Co., Ltd., Nagano, Japan

[21] Appl. No.: 33,570

[22] Filed: Mar. 18, 1993

[30] Foreign Application Priority Data

Mar. 19, 1992 [JP] Japan .................................. 4-023170

[51] Int. Cl.⁶ .............................. H02K 7/14; H02K 5/24; H02K 1/06
[52] U.S. Cl. ............................ 310/67 R; 310/51; 310/217
[58] Field of Search .................................. 310/51, 67 R, 310/91, 216, 217, 218, 254; 360/98.07, 99.04, 99.08

[56] References Cited

U.S. PATENT DOCUMENTS

| | | | |
|---|---|---|---|
| 4,626,727 | 12/1986 | Janson | 310/67 R |
| 4,634,908 | 1/1987 | Sturm | 310/64 |
| 4,703,212 | 10/1987 | Aboukrat et al. | 310/218 |
| 4,965,476 | 10/1990 | Lin | 310/51 |
| 5,013,957 | 5/1991 | Wrobel | 310/217 |
| 5,027,026 | 6/1991 | Mineta et al. | 310/51 |
| 5,030,864 | 7/1991 | Van Hout et al. | 310/67 R |
| 5,214,331 | 5/1993 | Yonei | 310/67 R |
| 5,355,043 | 10/1994 | Kaneda | 310/156 |

Primary Examiner—Steven L. Stephan
Assistant Examiner—Clayton E. LaBalle
Attorney, Agent, or Firm—McAulay Fisher Nissen Goldberg & Kiel

[57] ABSTRACT

A motor comprising a driving magnet attached to a rotor, a stator core which is disposed facing to the driving magnet and on which a coil is wound around each of a plurality of salient poles thereon, a motor frame securing the stator core, a first mounting section provided on the motor frame to mount the neighborhood of the base side of each salient pole, a second mounting section provided on the motor frame and formed integrally therewith to mount the edge side of each salient pole. The first mounting section and second mounting section are provided on the motor frame to mount the neighborhood of the base side and the edge side of the plurality of salient poles of the stator core, so that the motor which is able to prevent the vibration caused by a magnetic imbalance from being generated and to improve the shock resistance. Further, the motor may be more readily flattened and certain motor relationships are defined providing advantageous performance capabilities.

21 Claims, 5 Drawing Sheets

DRIVING MOTOR

BACKGROUND OF THE INVENTION

1. Field of the Invention

The present invention relates to a motor and more particularly to a structure for mounting a stator core having a plurality of salient poles to a motor frame.

2. Description of the Related Art

FIG. 6 shows a structure of a prior art motor, i.e. a structure of a motor having a stator core on which a plurality of salient poles are formed as a stator part of the motor. In more detail, the figure shows a magnetic disk driving unit comprising a hub for mounting a magnetic disk (not shown) and the motor having the stator core for rotating and driving the magnetic disk in the hub. In the figure, the cup shaped hub 32 is secured to a rotating shaft 31. The magnetic disk is mounted on the peripheral part of the hub 32 to rotate and drive in one body with the rotating shaft 31. A driving magnet 34 is attached within the inner peripheral part of the hub 32. The rotating shaft 31, hub 32 and driving magnet 34 compose a rotor section of the motor.

Disposed at a position facing the driving magnet 34 is the stator core 35 and a coil 38 is wound around each salient pole of the stator core 35 a predetermined number of times. The neighborhood of a base side 36 of the plurality of salient poles of the stator core 35 is mounted on a cylindrical support (outer peripheral part) 40 attached to a motor frame 39. That is, the neighborhood of the base side 36 of the plurality of salient poles is mounted on the support 40 and it secured thereto by an adhesive or the like. The stator part of the motor comprises the stator core 35 on which the salient poles are formed, the coil 38 wound around each of the salient poles and the motor frame 39.

On the other hand, a pair of ball bearings 41 disposed by being separated by a predetermined distance in the axial direction are secured between the rotating shaft 31 and the inner peripheral part of the support 40.

Although the stator core 35 shown in FIG. 6 is constructed so that it has a thickness in the axial direction of the rotating shaft 31 because it is wound by the coil 38 in the longitudinal direction thereof which is parallel to the axial direction, it is caused by a convenience in using recording media mounted.

The driving magnet 34 and the stator core 35 on which the salient poles are wound by the coil 38 compose a magnetic circuit.

In the structure of the prior art motor described above, however, only the neighborhood of the base side 36 of each salient pole of the stator core 35 is mounted and an edge side 37 of each salient pole of the stator core 35 is in free end state, i.e. it floats against the motor frame 39, so that a magnetic imbalance is caused due to a magnetic distribution and the like of the driving magnet 34 during driving of the motor. The magnetic imbalance causes the stator core 35 to vibrate, generating a vibration of the motor itself as a result.

Especially for the type of magnetic disk driving unit shown in FIG. 6, strict conditions are imposed on the stabilization of rotation and drive of the motor in order to increase the capacity of the magnetic disk by narrowing down the width of recording track to improve recording density thereon and to downsize the motor itself.

Further, there has been a disadvantage in the prior art motor structure that when the motor is flattened, its shock resistance becomes weak because enough wall thickness cannot be taken for the motor frame 39. If the shock resistance is weak, it causes a problem that when equipment on which such magnetic disk driving unit as described here is mounted, i.e. a computer, is dropped by mistake, the motor frame 39 will be broken, thereby disabling the computer.

U.S. Pat. Nos. 4,965,476 and 5,157,295 show the use of a stabilizer ring for stiffening purposes and to modify the frequency of vibration of a motor.

OBJECTS AND SUMMARY OF THE INVENTION

Accordingly, it is an object of the present invention to overcome the aforementioned disadvantages by providing a motor which is adapted to prevent vibration of the motor itself caused by the magnetic imbalance.

Another object of the present invention is to permit further flattening of disk drive motors without weakening such motors and to provide particular configurations of such flattened motors having special advantages, which have improved shock resistance and which are adapted to being flattened without deterioration of vibration and shock resistance parameters.

In order to achieve the aforementioned goals, according to the present invention, a motor comprises a driving magnet attached to a rotor, a stator core which is disposed facing to the driving magnet and on which a coil is wound around each of a plurality of salient poles thereon, a rotor frame securing the stator core, a first mounting section provided on the motor frame to mount the neighborhood of the base side of each salient pole, a second mounting section provided on the motor frame and formed integrally therewith to mount the edge side of each salient pole. The second mounting section includes, in cross section, an upper portion supporting the pole edges and a lower portion connected with the frame, the upper porting being narrower than the lower portion.

According to a second aspect of the invention, a motor used for a magnetic disk driving unit comprises a cup-shaped hub on which a magnetic disk is mounted, a driving magnet attached in the inner peripheral portion of the hub, a stator core which is disposed facing to the driving magnet and on which a coil is wound around each of a plurality of salient poles thereon, a motor frame securing the stator core, a first mounting section provided on the motor frame and formed integrally therewith to mount the neighborhood of the base side of each salient pole and a second mounting section provided on the motor frame and formed integrally therewith to mount the edge side of each salient pole. The second mounting section includes, in cross section, an upper portion supporting the pole edges and a lower portion connected with the frame, the upper porting being narrower than the lower portion.

In a particular aspect of the invention, the disk drive motor has the following applicable relationships:

$L<R$; and $R=R_1-R_2$;

wherein $R_2$ represents the radial dimension from the central axis of the motor to the base of the salient poles; $R_1$ represents the radial dimension from the central axis of the motor to the end of the salient poles; R represents the length of each salient pole; and L represents the dimension from the base of the motor frame to the surface of the hub on which the disk rests.

According to the present invention, the first mounting section and second mounting section are provided on the motor frame to mount the neighborhood of the base side and the edge side of the plurality of salient poles of the stator core, so that the motor which is able to prevent vibration caused by a magnetic imbalance from being generated and improved the shock resistance may by realized. Further, the motor may be substantially flattened without deleteriously affecting its performance.

Other objects and many of the attendant advantages of this invention will be readily appreciated as the apparatus becomes better understood by reference to the following detailed description when considered in connection with the accompanying drawings.

DETAILED DESCRIPTION OF THE PREFERRED EMBODIMENTS

Figure 1:
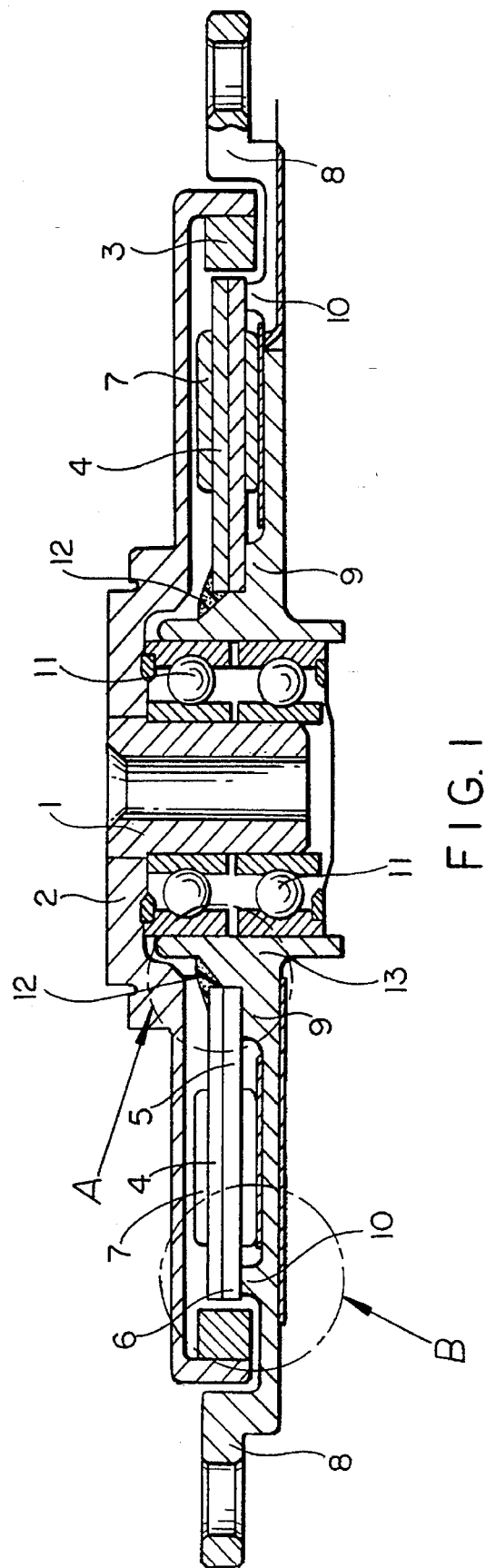
FIG. 1 is a section view showing a preferred embodiment of a motor of the present invention.

Referring now to the drawings, a preferred embodiment of the present invention will be explained based on an example in which a motor of the invention is used in a magnetic disk driving unit. FIG. 1 is a section view illustrating one embodiment of the magnetic disk driving unit, wherein a rotor 2 of the motor, which is called a hub in the magnetic disk driving unit and is dish-shaped as shown in the figure, is secured to a rotating shaft 1. A magnetic disk (not shown) is mounted on the outer periphery of the hub 2 and rotates in one body with the hub 2. A driving magnet 3 is attached on the inner peripheral surface of the hub 2. The rotating shaft 1, hub 2 and driving magnet 3 compose a rotor part of the motor.

Disposed facing the driving magnet 3 is a stator core 4 on which a plurality of salient poles are formed, and coil 7 winds around each of the salient poles a predetermined number of times.

Figure 6:
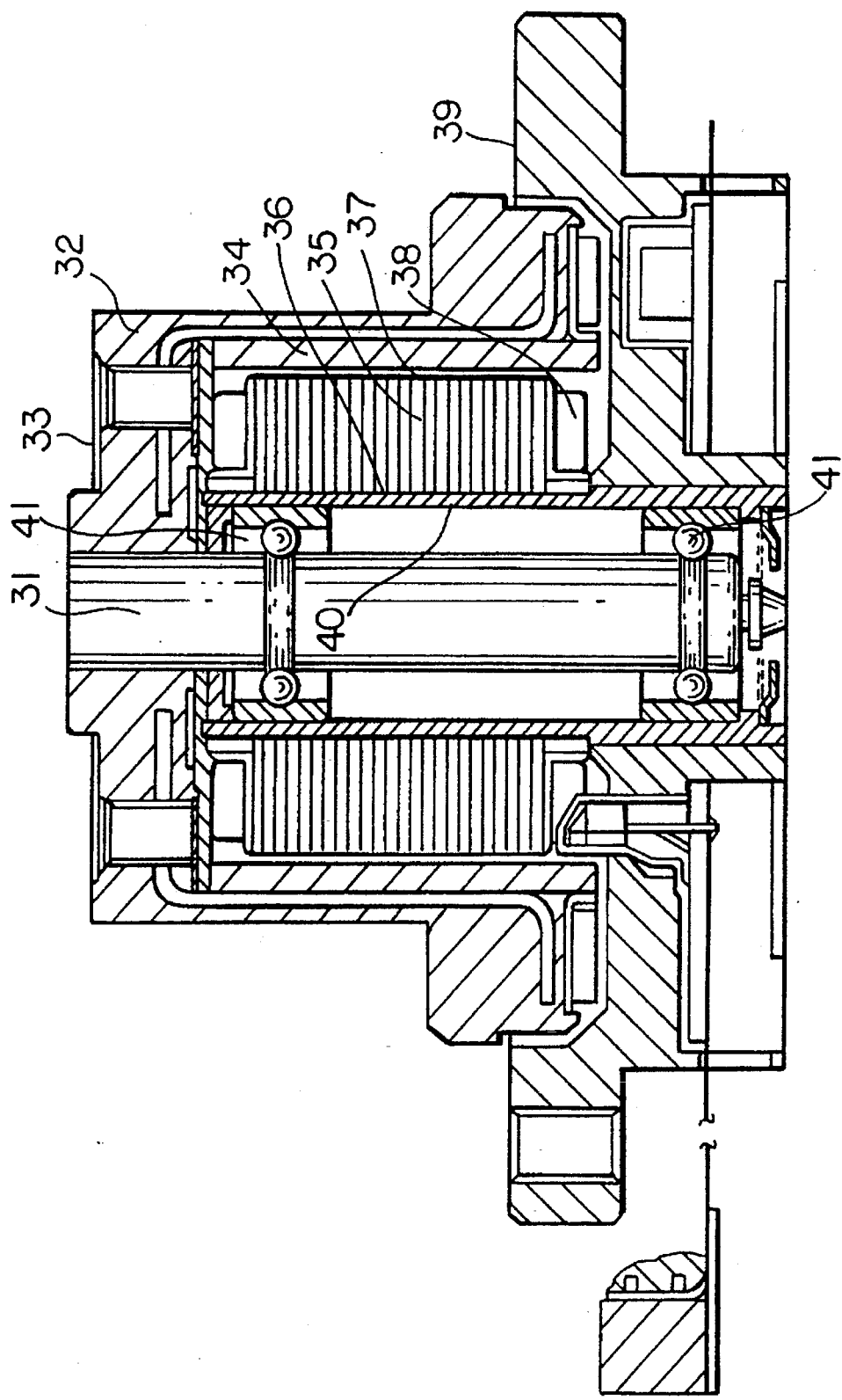
FIG. 6 is a section view showing a prior art motor.

The size of the motor in the axial direction of the rotating shaft 1 is shortened as compared to the prior art example shown in FIG. 6 due to flattening.

A motor frame 8 supports the stator core 4 and a hollow cylindrical support 13 is created at the center part of the motor frame 8. The rotating shaft 1 is rotatably supported in the inner peripheral part of the support 13 through the intermediary of a pair of ball bearings 11 which are separated by a predetermined distance.

The stator part of the motor comprises the stator core 4 on which the plurality of salient poles are formed, the coil 7 wound around each of the salient poles and the motor frame 8.

A first mounting section 9 having a flat surface for mounting the stator core 4 is created in the neighborhood of a base side 5 of the plurality of salient poles of the stator core 4 on the motor frame 8 and part of the side face of the base side 5 of the plurality of salient poles is mounted on the first mounting section 9 as shown in part A in FIG. 1. In the present invention, the term "mounting" refers to a state in which a member is placed upon a part of another member and such portion is firmly secured by an adhesive and the like.

Although the first mounting section 9 is created in the neighborhood of the base side 5 of the plurality of salient poles of the stator core 4, it may be created on the side of the center part of the stator core 4.

Further, a second mounting section 10 having a flat surface (generally trapezoidal in section in FIG. 1) to be able to mount an edge side 6 of the plurality of salient poles of the stator core 4 is created in a ring shape on the motor frame 8. Part of the side face of the edge side 6 of the plurality of salient poles of the stator core 4 is mounted on the second mounting section 10 as shown in part B in FIG. 1. In more detail, the portion of each of the salient poles of the stator core 4 around which the coil 7 is not wound is mounted on the second mounting section 10 created on the edge side 6 of the plurality of salient poles of the stator core 4.

Although the second mounting section 10 is created in a ring shape in the embodiment, it may not be a ring shape provided that each of the salient poles of the stator core 4 is securely mounted.

Furthermore, although the neighborhood of the base side 5 of the plurality of salient poles of the stator core 4 (center side of the stator core 4) is mounted on the first mounting section 9, the base side of the salient poles of the stator core 4 may be mounted thereon.

Next, a method for mounting the stator core 4 on each of the first mounting section 9 and the second mounting section 10 will be explained.

First, the method for mounting the side face in the neighborhood of the base side 5 of the plurality of salient poles of the stator core 4 on the first mounting section 9 is carried out using an adhesive 12.

The method for securing the side face of the edge side 6 of the plurality of salient poles of the stator core 4 is carried out by various ways, as follows.

Figure 2:
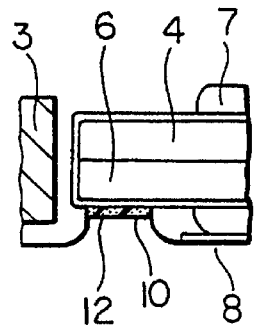
FIG. 2 is a partially sectional view for explaining a first arrangement for mounting a stator core of the motor of the embodiment.

A first securing method is implemented by securing the side face of the edge side 6 of the plurality of salient poles of the stator core 4 to the second mounting section 10 by means of the adhesive 12 as shown in FIG. 2. The adhesive 12 used is that composed of epoxy resin, for example, which has high shock resistance.

Figure 3:
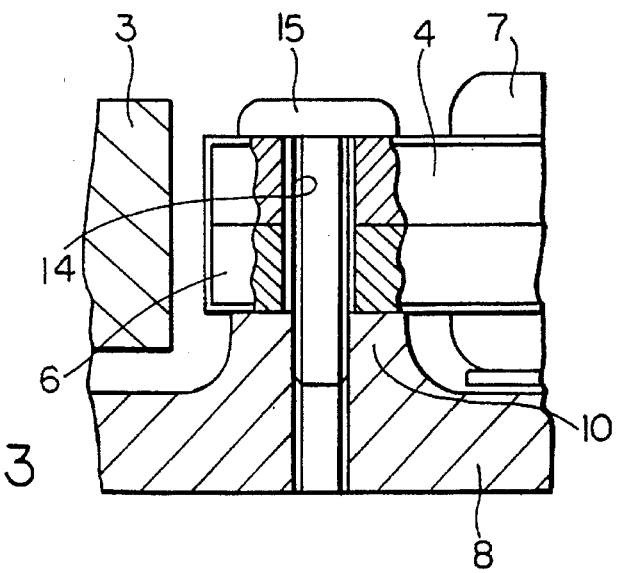
FIG. 3 is a partially sectional view for explaining a second arrangement for mounting a stator core of the motor of the embodiment.

FIG. 3 shows a second mounting method. According to this method, a through hole 14 as shown in the figure is created in the axial direction on the side of the edge side 6 of the salient poles of the stator core 4 and a screw hole is created on the second mounting section 10 of the motor frame 8. Then a machine screw 15 is inserted in the through hole 14 from the inside of the motor and screwed into the screw hole created on the second mounting section 10 of the motor frame 8 to secure them.

Figure 4:
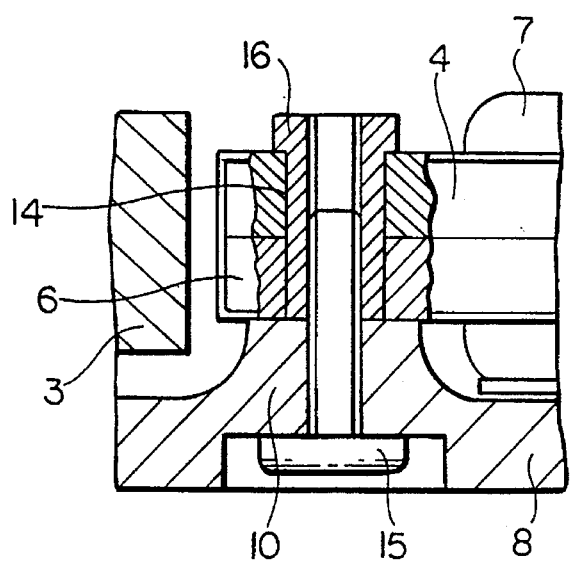
FIG. 4 is a partially sectional view for explaining a third arrangement for mounting a stator core of the motor of the embodiment.

FIG. 4 shows a third mounting method in which the direction for inserting the machine screw 15 is changed from that in the second securing method. Whether the inserting direction should be changed or not is determined whether there is a space for accommodating the screw 15 within the motor. That is, according to the third mounting method, the side face of the edge side 6 of the salient poles of the stator core 4 is secured by screwing the screw 15 into the through hole 14 through the intermediary of a bush 16 toward the inside of the driving motor from the outside thereof. The bush 16 is provided because a screw hole cannot be made on the side face of the edge side 6 of the salient poles of the stator core 4.

In the structure shown in FIGS. 3 and 4, the position where the through hole 14 is created on the stator core 4 is determined by simulating and analyzing the magnetic field and the like. That is, although the through hole 14 may narrow down a magnetic path for feeding magnetic flux from the driving magnet 3, the through hole 14 is provided at a position which brings about less influence based upon the aforementioned analysis.

Further, the magnetic path is prevented from being narrowed down by using a magnetic material for the machine screw 15 in the second mounting method and using a magnetic material for the screw 15 and bush 16 in the third securing method.

Figure 5:
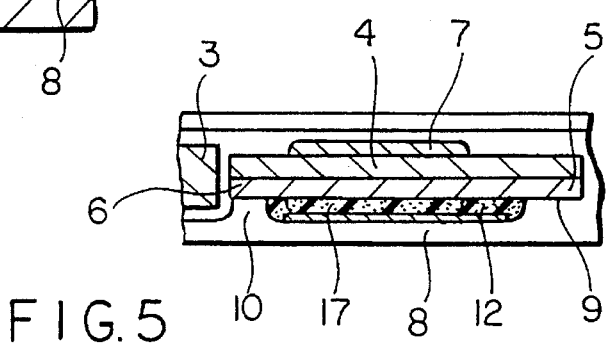
FIG. 5 is a partially sectional view for explaining a fourth arrangement for mounting a stator core of the motor of the embodiment.

FIG. 5 shows an example of a fourth mounting method in which the adhesive 12 is filled into a concave portion 17 which is created between the first and second mounting sections 9 and 10 provided on the motor frame 8 (the coil 7 wound around each of the salient poles is being accommodated in the figure) to mount the side face in the neighborhood of the base side 5 of the plurality of salient poles of the stator core 4 to the first mounting section 9 and to mount the side face of the edge side 6 of the plurality of salient poles of the stator core 4 to the second mounting section 10.

Although aluminum die-cast is generally used for the material of the motor frame 8 considering mass-producibility, it is desirable to use a material having a coefficient of thermal expansion equal with that of the material of the stator core 4 in order to prevent a strain on the motor frame 8 caused by a bimetallic effect. Such effect occurs when two metals having different coefficient of thermal expansions are laminated, so that a bending phenomenon is caused when temperature rises due to the difference of the coefficients of the thermal expansion.

As described above, according to the embodiments of the present invention, the first mounting section 9 and the second mounting section 10 are provided on the motor frame 8 to mount the side face in the neighborhood of the base side 5 of the plurality of salient poles of the stator core 4 on the first mounting section 9 and the side face of the edge side 6 of the salient poles on the second mounting section 10, so that the side face of the edge side 6 of the plurality of salient poles does not float and the vibration caused by the magnetic imbalance during driving of the motor may be prevented from being generated.

Further, even when the motor is flattened, because the first mounting section 9 and the second mounting section 10 are provided to mount the neighborhood of the base side and the edge side of the plurality of salient poles of the stator core 4, the stator core 4 becomes a reinforcing member of the motor frame 8, increasing the rigidity of the motor frame 8 and improving the shock resistance thereof.

The method of using the machine screw 15 as a method for mounting the stator core 4 on the second mounting section 10 has the advantage that efficiency of assembly work may be improved since the stator core 4 may be secured mechanically.

As described above, according to the present invention, the first mounting section and second mounting section are provided on the motor frame to mount the neighborhood of the base side and the edge side of the plurality of salient poses of the status core, so that the motor which is able to prevent the vibration caused by magnetic imbalance from being generated and to improve the shock resistance.

Figure 7:
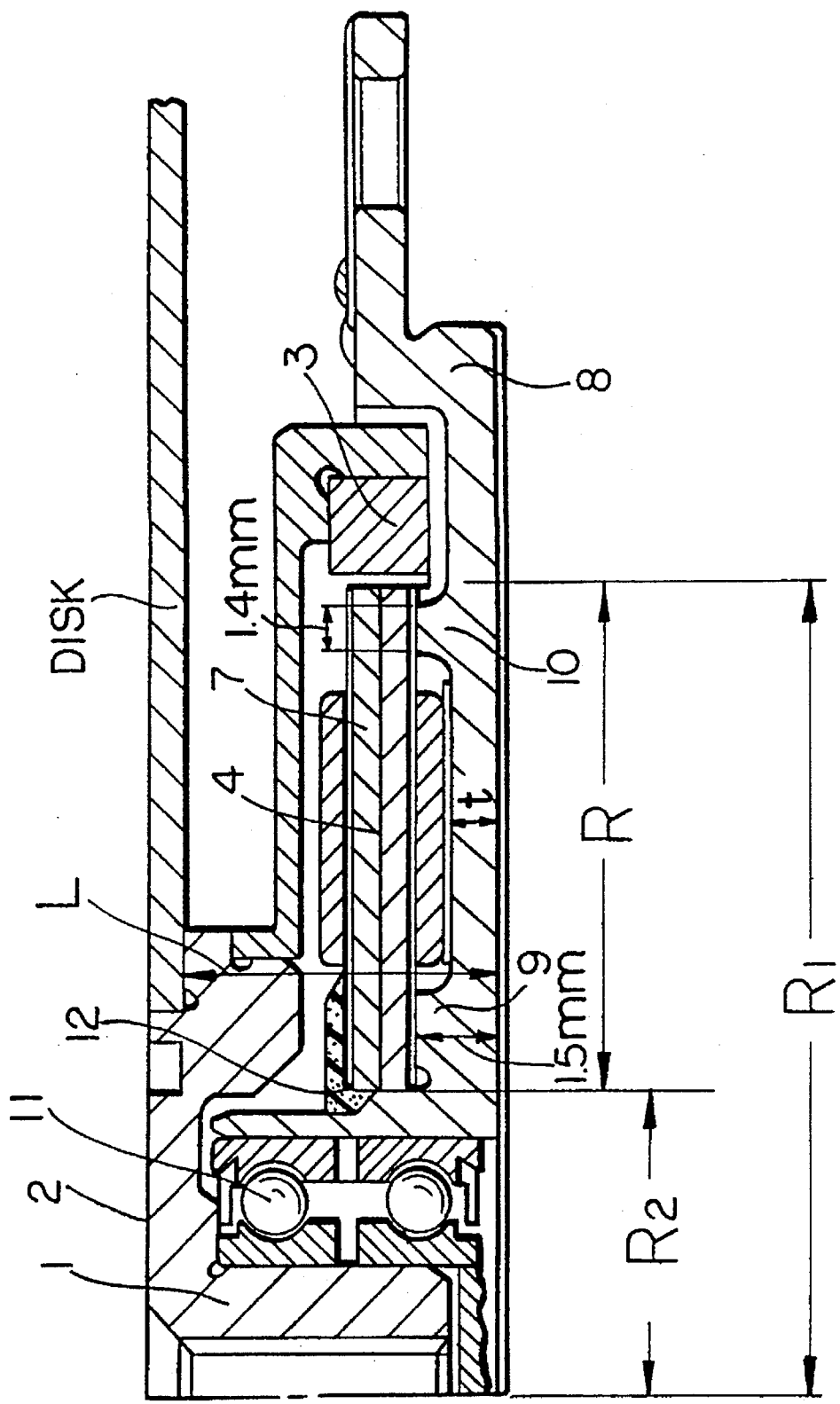
FIG. 7 is a first particular embodiment of the invention having an advantageous relationship between elements thereof.
Figure 8:
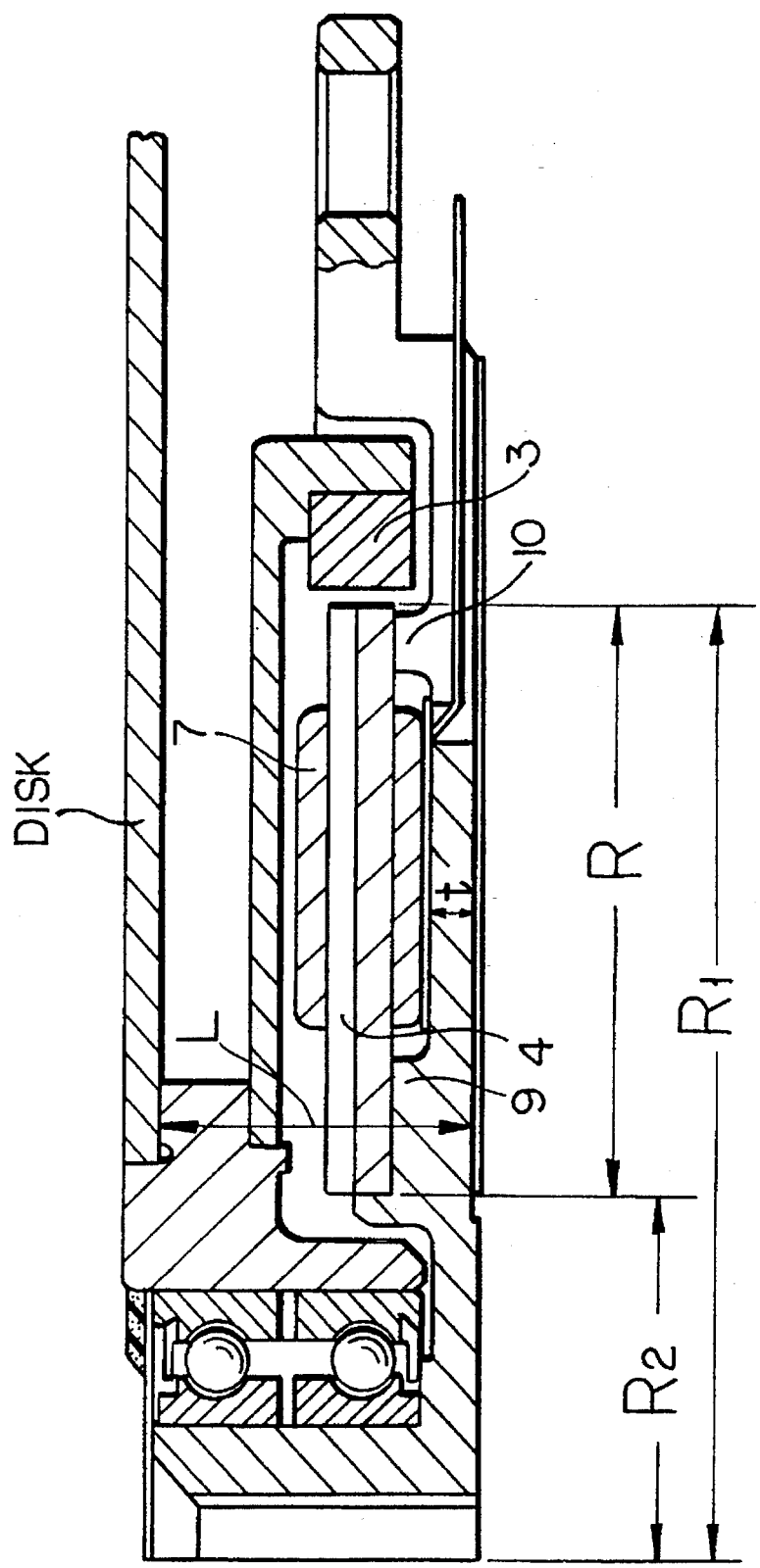
FIG. 8 is a second particular embodiment of the invention having an advantageous relationship between elements thereof.

Referring now to FIGS. 7 and 8, particular embodiments of disk drive motors are described which are substantially flattened relative to prior designs but, nevertheless, having an acceptable level of vibration and shock resistance. FIG. 7 is analogous to the general design of FIG. 1 and represents a rotating shaft disk drive motor. FIG. 8 is a stationary shaft disk drive arrangement with most elements having correspondence with those of FIG. 7 bearing the same element numbers. In FIGS. 7 and 8, $R_2$ represents the radial dimension from the central axis of the motor to the base of the salient poles; $R_1$ represents the radial dimension from the central axis of the motor to the end of the salient poles; R represents the length of the salient pole; L represents the dimension from the base of the motor frame to the surface of the hub on which the disk rests; and t is the thickness of the motor frame in the vicinity of the stator coil.

In the arrangement of FIGS. 7 and 8, the following relationships apply:

$$L < R; \text{ and}$$

$$R = R_1 - R_2.$$

In a particularly advantageous construction, the following relationship also applies:

$$\frac{R}{L} \geqq 1.5.$$

In a preferred construction of the motor in accordance with FIGS. 7 and 8, the salient poles are constructed as a laminate having at least two but no more than three laminae. The laminated construction also tends to reduce vibrations.

The following table indicates relevant dimensions of two examples of motors constructed according to these relationships (all dimensions being in mm).

TABLE I

|  | Example 1 (FIG. 7) | Example 2 (FIG. 8) |
| --- | --- | --- |
| L | 4.95 mm | 4.95 mm |
| $R_1$ | 4.7 mm | 5.5 mm |
| $R_2$ | 12.5 mm | 14.4 mm |
| R | 7.8 mm | 8.9 mm |
| t | 0.7 mm | 0.7 mm |

Disk drive motors constructed in accordance to such relationships as in the above two examples exhibit a very substantial degree of flattening in comparison to conventional motors while experiencing acceptable levels of vibration and shock resistance.

While the foregoing description and drawings represent the preferred embodiments of the present invention, it will be obvious to those skilled in the art that various changes and modifications may be made therein without departing from the true spirit and scope of the present invention.

What is claimed is:

1. A motor, comprising:

a driving magnet attached to a rotor;

a stator core which is disposed facing said driving magnet and on which a coil is wound around each of a plurality of salient poles thereon, each salient pole having a base side;

a motor frame securing said stator core;

a first mounting section provided on said motor frame to mount the neighborhood of the base side of said each salient pole; and a second mounting section provided on said motor frame to mount an edge side of said each salient pole, said second mounting section including, in cross section, an upper portion supporting said pole edges and a lower portion connected with said frame, said upper portion being narrower than said lower portion.

2. A motor used for a magnetic disk driving unit, comprising:

a cup-shaped hub on which a magnetic disk may be mounted;

a driving magnet attached to an inner peripheral portion of said hub;

a stator core which is disposed facing said driving magnet and on which a coil is wound around each of a plurality of salient poles thereon, each salient pole having a base side;

a motor frame securing said stator core;

a first mounting section provided on said motor frame to mount the neighborhood of the base side of said each salient pole; and a second mounting section provided on said motor frame to mount an edge side of said each salient pole said second mounting section including, in cross section, an upper portion supporting said pole edges and a lower portion connected with said frame, said upper portion being narrower than said lower portion.

3. The motor according to claim 1 or 2, wherein said second mounting section is formed into a ring shape.

4. The motor according to claim 1 or 2, wherein said second mounting section and said edge side of each salient pole are mounted using an adhesive.

5. The motor according to claim 1 or 2, wherein each salient pole has a through hole on said edge side and said second mounting section has a screw hole for mounting the edge side of each salient pole on the second mounting section using a screw.

6. The motor according to claim 1 or 2, wherein each salient pole has a through hole on said edge side for inserting a bush having a screw hole and wherein said second mounting section has a through hole for mounting the edge side of each salient pole on the second mounting section using a screw.

7. The motor according to claim 1 or 2 wherein said second mounting section is integrally formed with said frame.

8. The motor of claim 1 or 2 wherein said cross section is generally trapezoidal.

9. The motor of claim 2, wherein each salient pole has an end, said hub includes a surface on which a disk may be mounted and said motor frame includes a base and wherein $R_2$ represents the radial dimension from a central axis of the motor to the base of a salient pole; $R_1$ represents the radial dimension from the central axis of the motor to the end of a salient pole; R represents the length of each salient pole; L represents the dimension from the base of the motor frame to the surface of the hub on which the disk rests and wherein the following relationships apply:

$$L<R; \text{ and}$$

$$R=R_1-R_2.$$

10. The motor of claim 9 wherein the relation of R to L is as follows:

$$R/L \geq 1.5.$$

11. The motor of claim 1 or claim 2 wherein the salient poles are constructed as a laminate.

12. In a disk drive motor having a cup shaped hub including a surface on which a disk may be mounted, a driving magnet attached to an inner peripheral portion of said hub, a stator core which is disposed facing said driving magnet and on which a coil is wound around each of a plurality of salient poles thereon, each salient pole having a base side, a motor frame having a base securing said stator core, and a mounting section provided on said motor frame to mount the neighborhood of the base side of each salient pole, the improvement comprising the following relationships among parts of said motor;

$$L<R; \text{ and}$$

$$R=R_1-R_2$$

wherein $R_2$ represents the radial dimension from a central axis of the motor to the base of a salient pole; $R_1$ represents the radial dimension from the central axis of the motor to the end of a salient pole; R represents the length of the salient poles; and L represents the dimension from the base of the motor frame to said surface of the hub on which a magnetic disk rests.

13. The motor of claim 12 wherein the relationship of R to L is as follows:

$$R/L \geq 1.5.$$

14. The disk drive motor of claim 12 or claim 13 wherein said mounting section is a first mounting section and a second mounting section is provided on said motor frame and formed integrally therewith to mount a side edge of each salient pole.

15. The disk drive motor of claim 12 or claim 13 wherein the salient poles are constructed as a laminate.

16. The disk drive motor of claim 15 including at least two but not more than three laminae.

17. The disk drive motor of claim 14, wherein said second mounting section includes, in cross section, an upper portion supporting said pole edges and a lower portion connected with said frame, said upper portion being narrower than said lower portion.

18. A motor, comprising:

a driving magnet attached to a rotor;

a stator core which is disposed facing said driving magnet and on which a coil is wound around each of a plurality of salient poles thereon, each salient pole having a base side;

a motor frame securing said stator core;

a first mounting section provided on said motor frame to mount the neighborhood of the base side of said each salient pole; and a second mounting section provided on said motor frame to mount an edge side of said each salient pole, said second mounting section including, in cross section, an upper portion supporting said pole edges and a lower portion connected with said frame, said upper portion being narrower than said lower portion, and wherein each salient pole has a through hole on said edge side and said second mounting section has a screw hole for mounting the edge side of each salient pole on the second mounting section using a screw, including a screw mounting the edge side of each salient pole on the second mounting section, said screw being made from a magnetic material.

19. A motor used for a magnetic disk driving unit, comprising:

a cup-shaped hub on which a magnetic disk may be mounted;

a driving magnet attached to an inner peripheral portion of said hub;

a stator core which is disposed facing said driving magnet and on which a coil is wound around each of a plurality of salient poles thereon, each salient pole having a base side;

a motor frame securing said stator core;

a first mounting section provided on said motor frame to mount the neighborhood of the base side of said each salient pole; and a second mounting section provided on said motor frame to mount an edge side of said each salient pole, said second mounting section including, in cross section, an upper portion supporting said pole edges and a lower portion connected with said frame, said upper portion being narrower than said lower portion, and wherein each salient pole has a through hole on said edge side and said second mounting section has a screw hole for mounting the edge side of each salient pole on the second mounting section using a screw, including a screw mounting the edge side of each salient pole on the second mounting section, said screw being made from a magnetic material.

20. A motor, comprising:

a driving magnet attached to a rotor;

a stator core which is disposed facing said driving magnet and on which a coil is wound around each of a plurality of salient poles thereon, each salient pole having a base side;

a motor frame securing said stator core;

a first mounting section provided on said motor frame to mount the neighborhood of the base side of said each salient pole; and a second mounting section provided on said motor frame to mount an edge side of said each salient pole, said second mounting section including, in cross section, an upper portion supporting said pole edges and a lower portion connected with said frame, said upper portion being narrower than said lower portion, and wherein each salient pole has a through hole on said edge side for inserting a bush having a screw hole and wherein said second mounting section has a through hole for mounting the edge side of each salient pole on the second mounting section using a screw, including a bush in each salient pole and a screw mounting the edge side of each salient pole on the second mounting section, wherein said bush and screw are made from a magnetic material.

21. A motor used for a magnetic disk driving unit, comprising:

a cup-shaped hub on which a magnetic disk may be mounted;

a driving magnet attached to an inner peripheral portion of said hub;

a stator core which is disposed facing said driving magnet and on which a coil is wound around each of a plurality of salient poles thereon, each salient pole having a base side;

a motor frame securing said stator core;

a first mounting section provided on said motor frame to mount the neighborhood of the base side of said each salient pole; and a second mounting section provided on said motor frame to mount an edge side of said each salient pole, said second mounting section including, in cross section, an upper portion supporting said pole edges and a lower portion connected with said frame, said upper portion being narrower than said lower portion, and wherein each salient pole has a through hole on said edge side for inserting a bush having a screw hole and wherein said second mounting section has a through hole for mounting the edge side of each salient pole on the second mounting section using a screw, including a bush in each salient pole and a screw mounting the edge side of each salient pole on the second mounting section, wherein said bush and screw are made from a magnetic material.

* * * * *